United States Patent Office 3,625,700
Patented Dec. 7, 1971

3,625,700
EDIBLE COMPOSITIONS CONTAINING 2',4',6',3-TETRAHYDROXY - 4 - n-PROPOXYDIHYDRO-CHALCONE 4'-β-NEOHESPERIDOSIDE
Leroy O. Krbechek, Deerfield, and George Inglett, Peoria, Ill., assignors to International Minerals & Chemical Corporation
No Drawing. Continuation-in-part of application Ser. No. 622,098, Mar. 10, 1967. Division of application 638,623, May 15, 1967. This application Oct. 23, 1969, Ser. No. 870,341
Int. Cl. A23l 1/26
U.S. Cl. 99—141 A                    4 Claims

ABSTRACT OF THE DISCLOSURE

The novel compound 2',4',6',3-tetrahydroxy-4-n-propoxydihydrochalcone 4'-β-neohesperidoside is useful as a sugar substitute and sweetening agent in edible formulations.

CROSS-REFERENCE TO RELATED APPLICATION

This application is a continuation-in-part application of copending United States patent application Ser. No. 622,098, filed Mar. 10, 1967 and a division of application Ser. No. 638,623, filed May 15, 1967 now Patent No. 3,522,236.

BACKGROUND OF THE INVENTION

Natural materials belonging to the broad classification of materials referred to as "sugars" normally are employed as sweetening agents in formulations employed for human consumption. While the utilization of sugars as sweetening agents has been satisfactory in achieving the desired enhancement of the sweetness and taste characteristics of edible formulations, in numerous instances the overall results obtained due to the use of the naturally occurring or derived sugars have not been completely suitable.

Investigators have substantiated that obesity is detrimental to achieving and maintaining optimum functioning of the various systems of the human body and, hence, it generally is considered a factor which shortens longevity. Social pressures further tend to encourage the practice of weight control as a matter of conveying an appearance of youthful vitality and neatness. Hence, the use of sugars which have a relatively high caloric value has not been completely satisfactory in supplying the total sweetness requirements of individuals concerned with weight control. Indeed, during the past decade an extensive market has developed, particularly in soft drinks, candies, desserts, and other confectionaries, for foods which, although sweet, are low in caloric value. The use of sugars as a sweetening agent, moreover, has not proven to be suitable in the diet of many individuals such as diabetics who have abnormal body metabolism. Accordingly, there has been a continuing search in the art for substances free of such disadvantages and useful as sugar-substitute sweetening agents.

Various sugar substitutes, including substances derived from naturally occurring sources and those produced synthetically, have been proposed for utilization. Although the majority of such previously proposed sugar-substitutes has been satisfactory in providing adequate sweetness, those presently available have not proven to be completely suitable for one or more reasons involving a lack of a readily available starting material, a use of a complicated and expensive preparation and/or synthesis, and more importantly, an accompanying inherent characteristic of creating undesirable after-taste effects as evidenced by a biting, bitter, or metallic feeling in the consuming individual's mouth Certain of such previously proposed substitute sweetening agents furthermore are characterized by solubility properties which render them unsuitable for certain applications and in some instances, where modified such as by the formation of a soluble metal salt, are converted to a form which is unacceptable in the diets of individuals restricted to the consumption of formulations free of such metals.

U.S. Pat. No. 3,087,821, issued Apr. 30, 1963, is directed to certain dihydrochalcones which are disclosed as being useful as sugar substitutes. The compounds of the invention can be prepared from corresponding flavanone glycosides by conversion of the flavanone glycoside to the corresponding chalcone and reduction of the intermediate chalcone to the dihydrochalcone. The patent discloses that neohesperidin dihydrochalcone is outstanding in its level of sweetness.

SUMMARY OF THE INVENTION

In one aspect of the present invention there is provided a novel compound, 2',4',6',3-tetrahydroxy-4-propoxydihydrochalcone 4'-β-neohesperidoside which has the structural formula

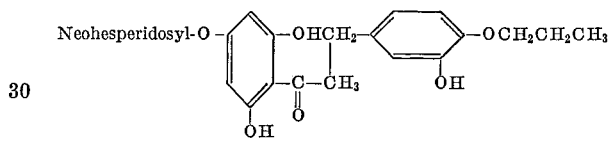

It has been found that this compound is a stable, water-soluble compound having intensely sweet characteristics. More specifically, it has been found to be over 2,000 times sweeter than sucrose. In contradistinction to closely similar compounds, 2',4',6',3-tetrahydroxy-4-n-propoxydihydrochalcone 4'-β-neohesperidoside is not characterized by unattractive after-taste qualities. It has been found, moreover, that when it is used at levels where after-taste can be detected, the sensation observed by an individual is not one of bitterness or metallic taste, but a pleasing, cooling sensation. Furthermore, although 2',4',6',3 - tetrahydroxy-4-n-propoxydihydrochalcone 4'-β-neohesperidoside contains a "sugar" moiety in the molecule, its intensive sweetness characteristics allow it to be employed as a sweetening agent for edible formulations in relatively small amounts (0.0001 to 1% by weight), whereby the incorporation of the compound contributes practically negligibly to the caloric value of the ultimate formulation.

DESCRIPTION OF THE PREFERRED EMBODIMENTS

The 2',4',6',3-tetrahydroxy - 4 - n-propoxydihydrochalcone 4'-β-neohesperidoside may be synthesized from readily available starting materials, i.e., 3-hydroxy-4-n-propoxy benzaldehyde and phloracetophenone 4'-β-neohesperidoside, the latter being an alkaline degradation product of naringen (Tetrahedan 19, pp. 773–82). The method of preparation is disclosed in detail in said copending patent application Ser. No. 622,098. The 2',4',6',3-tetrahydroxy-4-n-propoxydihydrochalcone 4'-β-neohesperidoside is prepared by initially condensing phloracetophenone 4'-β-neohesperidoside and 3-hydroxy-4-n-propoxy benzaldehyde in an alkali-containing inert reaction medium to form the intermediate, 2',4',6',3-tetrahydroxy-4-n-propoxychalcone 4'-β-neohesperidoside, which is subsequently converted to the dihydrochalcone of this invention, viz, 2',4',6',3-tetrahydroxy - 4 - n-propoxydihydrochalcone 4-β-neohesperidoside.

There are many possible variations for preparing the reaction mixtures used for the initial condensation. The phloracetophenone derivative and the benzaldehyde reactant, as well as the alkali may be dissolved in the same quantity of the reaction medium, e.g., water, or they may be dissolved in separate quantities of the reaction medium and the resulting solutions are then combined. In addition, good yields are obtained by adding solid reactants to the reaction medium.

The relative proportions of the reactants in the initial condensation may vary over a relatively wide range, e.g., in amounts corresponding to the mol ratio of the benzaldehyde compound to the phloracetophenone derivative in the range of from about 0.5:1 to about 5:1. In a typical condensation, the alkali, e.g., sodium hydroxide or potassium hydroxide, is used in an amount of about 30% to 35% by weight based on the combined weight of the reaction medium plus alkali (as distinct from the total weight of the reaction mixture). As an example of typical condensation conditions, a reaction temperature of about 115° to 120° C. is maintained at ambient pressure for a period of time, e.g., five minutes, sufficient to obtain the chalcone condensation product, namely, 2',4',6',3-tetrahydroxy-4-n-propoxychalcone 4'-β-neohesperidoside.

The condensation product can be recovered in either the flavanone form (3',5,7-trihydroxy-4'-n-propoxyflavanone 7-β-neohesperidoside) or the chalcone form (2',4',6',3-tetrahydroxy-4-n-propoxychalcone 4'-β-neohesperidoside) depending upon the manner in which the condensation mixture is treated at the end of the reaction time. One technique for recovering the reaction product in the chalcone form consists of cooling the reaction mixture to below room temperature, e.g., preferably to about —15° to 10° C. The chalcone is caused to precipitate by adding a mineral acid such as dilute sulfuric or hydrochloric acid to the cooled reaction mixture to acidify it to a pH of about 1 to 9, preferably of about 3 to 8, and most preferably of about 4 to 7. The chalcone generally will not precipitate immediately, but will precipitate if the reaction mixture is allowed to stand for at least a few hours, or sooner if stirred. The chalcone precipitate is recovered by filtration, centrifugation, and the like. If the chalcone precipitate is not recovered, but is allowed to stand in the mother liquor, it may cyclize to the flavanone form.

Alternatively, the product may be recovered in the flavanone form by acidification of the reaction mixture with a suitable mineral acid to a pH of about 3 to 10 while maintaining the reaction mixture at an elevated temperature, e.g., between about 60° and 120° C., and preferably between about 70° and 85° C. In this embodiment, a pH of about 4 to 9 is preferred with a pH of about 5 to 8 being most preferred. The flavanone form of the product is formed as a precipitate, and is recovered by any suitable method, such as by filtration. The flavanone is readily converted back to the chalcone form by mixing it with an alkali solution, e.g., an aqueous solution having a sodium hydroxide or potassium hydroxide concentration of at least about 5%.

Even if the product is recovered in the form of the chalcone, it can be converted to the flavanone form. For example, the chalcone-containing precipitate is heated in its mother liquor, water, or a suitable organic solvent such as a low molecular weight ketone, e.g., acetone, or an alcohol, e.g., methyl, ethyl or isopropyl alcohol, to the above-mentioned elevated temperature of about 60° to 120° C., preferably about 70° to 85° C., to convert the product to the flavanone form.

The chalcone can also be receivered from the aqueous reaction mixture or from the filtrate by a solvent extraction technique. The aqueous reaction mixture or the filtrate is initially treated with a water immiscible organic solvent which is a solvent for excess reactants and other impurities without, however, extracting the chalcone. Benzene, toluene, cyclohexane, and carbon tetrachloride are suitable solvents for this purpose. The aqueous phase containing the chalcone is then separated from the organic solvent phase and extracted with a lower alkyl ester of a low molecular weight aliphatic acid. Typical esters which are suitable for this purpose include ethyl acetate, isopropyl acetate, n-propyl acetate and ethyl propionate. The chalcone is extracted by the ester and may be recovered therefrom or suitably treated for future recovery.

The chalcone condensation product can be converted by hydrogenation to the 2',4',6',3-tetrahydroxy-4-n-propoxydihydrochalcone 4'-β-neohesperidoside using techniques well known to the art. One technique which has proven particularly successful involves hydrogenating the chalcone product in a caustic solution, such as a solution of sodium hydroxide, in the presence of a hydrogenation catalyst, such as nickel. The resultant dihydrochalcone is then recovered from the final hydrogenation reaction by conventional procedures which may involve an initial filtration to remove residual catalyst and other solid impurities, an acidification of the filtrate to a pH of about 3 to 6 to precipitate the dihydrochalcone, and a recovery of the dihydrochalcone precipitate, as by filtration. The resultant dihydrochalcone product may then be further purified by recrystallization from a suitable solvent such as water, acetone, methanol and the like.

The compound 2',4',6',3-tetrahydroxy-4-n-propoxydihydrochalcone 4'-β-neohesperidoside is advantageously adapted to be employed as a sweetening agent in any material or formulation intended for human consumption in view of its intense sweetness, water-solubility, stability, low caloric value when employed in amounts desired to yield effective sweeness levels, and lack of undesirable after-taste qualities when used in such amounts. Representative examples of edible materials, i.e., materials intended for consumption or at least to come in contact with the mouth of the ultimate user, include fruits, vegetables, meats, nuts, cereals, carbonated and non-carbonated soft drinks, alcoholic beverages, pastries, candies, frozen and non-frozen desserts and dessert supplements, chewing gums, toothpastes, mouth rinses, tobacco products, and the like.

The actual amount of 2',4',6',3-tetrahydroxy-4-n-propoxydihydrochalcone 4'-β-neohesperidoside employed as a sweeting agent in a particular application depends primarily upon the nature of the material to be sweetened and the ultimate level of sweetness desired to be attained. There is no particular criticality attendant the use of any specific amount of the novel sweetner of the invention. Due to the intense sweetness of 2',4',6',3-tetrahydroxy-4-n-propoxydihydrochalcone 4'-β-neohesperidoside, the amount thereof usually employed is less than about 1% by weight of the formulation being sweetened by the addition thereof and more often the amount of the sweetener is less than 0.5% by weight and in the range of from about 0.0001 to about 0.1% by weight of the edible formulation constituting the base material.

It will be apparent that the sweetening agent of the present invention may be employed separately or in conjunction with a non-toxic diluent carrier at the time of its incorporation into a material ultimately desired to be sweetened thereby. Such diluents suitably may be inorganic or organic liquids, solids, or semi-solids. Specific examples of suitable diluents include water, ethanol, glycerol, salt, sugar, gelatin, sorbitol, citric acid, cyclamate, saccharin, flour, mixtures of such diluents, and any other non-toxic compatible substance.

The invention having been broadly described, the following examples are given to demonstrate specific embodiments thereof. It will be understood that the examples are given merely for illustrative purposes and not by way of limitation.

Example I

Phloracetophenone-4'-β-neohesperidoside in the amount of 7.5 grams (0.016 mole) was added to a solution containing about 10.3 grams of potassium hydroxide in 20 milliliters of water at 110°–115° C. To the resulting hot, clear solution 3.75 grams (0.022 mole) of 3-hydroxy-4-n-propoxy benzaldehyde were added. The solution was maintained at 115°–120° C. for five minutes and was then poured onto 150 grams of ice. The solution was acidified with cold, dilute hydrochloric acid to provide a solution having a pH of 6.5 and a temperature below 10° C. Ultraviolet examination of the cool, acidified solution showed an intense absorption at about 370 m$\mu$, which is characteristic of the chalcone structure.

Cyclization of the chalcone to the flavanone was effected by heating the solution to 80°–90° C. for one-half hour. The heated solution was then cooled to below 40° C. (the boiling point of methylene chloride) and extracted with two 100 milliliter portions of methylene chloride, from which 1.5 grams of unreacted 3-hydroxy-4-n-propoxy benzaldehyde were obtained. The precipitate was collected from the cold aqueous phase. The crude product was recrystallized twice from 100 milliliters of water and filtered at 30°, then triturated twice with 35 milliliters of water and filtered at 80° C. to yield 1.3 grams (13% yield based on the phloracetophenone) of 3',5,7-trihydroxy-4'-n-propoxyflavanone 7-$\beta$-neohesperidoside, having a melting point of 222°–224° C.

*Analysis.*—Calculated for $C_{30}H_{38}O_{15}$ (percent): 56.42 C; 5.99 H. Found (percent): 56.13 C; 6.40 H.

A solution of 1.2 grams of purified 3',5,7-trihydroxy-4'-n-propoxyflavanone 7-$\beta$-neohesperidoside in 50 milliliters of 20% potassium hydroxide was hydrogenated on a Parr shaker in the presence of 0.5 gram of 5% palladium on charcoal. The solution was acidified with cold, dilute hydrochloric acid to provide a solution having a pH of 5.5 and a temperature below 10° C. The catalyst was removed from the solution and sodium chloride was added. The gum-like product was collected from the cold solution. The crude product was recrystallized four times with 50 milliliters of water to yield 0.6 gram (50% yield) of 2',4',6',3-tetrahydroxy-4-n-propoxydihydrochalcone 4'-$\beta$-neohesperidoside, melting point of 142°–144° C.

*Analysis.*—Calculated for $C_{30}H_{40}O_{15}$ (percent): 56.21 C, 6.29 H. Calculated for $C_{30}H_{40}O_{15} \cdot \frac{1}{2}H_2O$ (percent): 55.47 C, 6.36 H. Found (percent): 55.70 C, 6.49 H, 55.58 C, 6.32 H.

Example II

In order to compare the sweetness of 2',4',6',3-tetrahydroxy-4-n-propoxydihydrochalcone 4'-$\beta$-neohesperidoside with that of sucrose, serially diluted aqueous solutions of 2',4',6',3-tetrahydroxy-4-n-propoxydihydrochalcone 4'-$\beta$-neohesperidoside were prepared and labeled for identification by a sample number. The resultant samples were tasted by a panel of individuals with reference to a 5% aqueous solution of sucrose in order to determine the dilution of the sweetener of this invention having an equivalent sweetness level as that of the sucrose control solution. The averaged results of these tests revealed that a solution of 2',4',6',3-tetrahydroxy-4-n-propoxydihydrochalcone 4'-$\beta$-neohesperidoside having a concentration of about 0.00228% is equivalent in sweetness to the sucrose control solution, i.e., 2',4',6',3-tetrahydroxy-4-n-propoxydihydrochalcone 4'-$\beta$-neohesperidoside is characteribed by a sweetness of about 2,200 times that of sucrose.

Example III

In this test serially diluted aqueous solutions of 2',4',6',3 - tetrahydroxy-4-n-propoxydihydrochalcone 4'-$\beta$-neohesperidoside and of sucrose were each tasted by a panel of individuals to select the sample of each series in which a sweetness was first detected (sweetness threshold). The averaged results revealed that the threshold concentration of 2',4',6',3-tetrahydroxy-4-n-propoxydihydrochalcone 4'-$\beta$-neohesperidoside was about 0.000226% and the threshold concentration of sucrose was about 0.45%, i.e., 2', 4',6',3-tetrahyroxy-4-n-propoxydihydrochalcone 4'-$\beta$-neohesperidoside was judged to be about 2,100 times sweeter than sucrose.

Example IV

The result of tests similar to those of Example II are given in this Example IV to provide a basis of comparison between the sweetness of 2',4',6',3-tetrahydroxy-4-n-propoxydihydrochalcone 4'-$\beta$-neohesperidoside and that of neohesperidin dihydrochalcone and the ethoxy homolog thereof, i.e., 2',6',3-trihydroxy-4-ethoxydihydrochalcone 4'-$\beta$-neohesperidoside.. The general procedure of Example II was repeated except that serially diluted aqueous solutions of neohesperidin dihydrochalcone and 2',6',3-trihydroxy - 4 - ethoxydihydrochalcone 4'-$\beta$-neohesperidoside were compared with a 5% aqueous solution of sucrose. The result of these tests revealed that both of these compounds were only about 1,000 times sweeter than sucrose.

It can thus be noted that the sweetness characteristic of the compound of this invention is entirely unexpected since it is about twice as sweet as the two lower homologs.

We claim:

1. A sweeting composition comprising as the sweeting agent the compound 2',4',6',3-tetrahydroxy-4-n-propoxydihydrochalcone 4'-$\beta$-neohesperidoside and a non-toxic edible substance as a carrier for said compound.

2. The composition according to claim 1 wherein said carrier is water.

3. The composition according to claim 1 wherein said carrier is a food for human consumption.

4. The composition according to claim 1 wherein said compound is present in said composition in an amount in the range of from about 0.001% to about 1% by weight.

References Cited

UNITED STATES PATENTS

| 3,087,821 | 4/1963 | Horowitz et al. | 99—141 |
| 3,375,242 | 3/1968 | Horowitz et al. | 260—210 |
| 3,522,236 | 7/1970 | Krbechek et al. | 260—210 |

RAYMOND N. JONES, Primary Examiner

R. B. ANDEWELT, Assistant Examiner

FO-1050
(5/69)

UNITED STATES PATENT OFFICE
CERTIFICATE OF CORRECTION

Patent No. 3,625,700      Dated December 7, 1971

Inventor(s) Leroy O. Krbechek, et al.

It is certified that error appears in the above-identified patent and that said Letters Patent are hereby corrected as shown below:

Column 2, line 23, between "4-" and "propoxydihy-", the letter --n-- should be inserted. Column 3, line 69, "receiver should read --recovered--. Column 4, line 44, "sweeteing" should read --sweetening--; line 54, between "than" and "0.5%" the word --about"" should be inserted. Column 6, line 3, "characteribed" should read --characterized--; line 26, between "2'" and "6'", --4'-- should be inserted; line 26, "2',6',3-trihydroxy-4-ethoxydihydro-" should read, --2',4',6',3-tetrahydroxy-4-n-ethoxydihydro- --; line 30, "2',6',3-trihydroxy - 4 -" should read --2',4',6',3-tetrahydroxy-4-n--; line 39, first occurrence of "sweeting" should read --sweetened--; second occurence of "sweeting" should read --sweetening--; line 49, "0.001%" should read --0.0001%--.

Signed and sealed this 11th day of July 1972.

(SEAL)
Attest:

EDWARD M.FLETCHER, JR.
Attesting Officer

ROBERT GOTTSCHALK
Commissioner of Patents